United States Patent

[11] 3,591,957

| [72] | Inventor | Claus Christian Cobarg<br>Steinbach/Taunus, Germany |
|---|---|---|
| [21] | Appl. No. | 781,935 |
| [22] | Filed | Dec. 6, 1968 |
| [45] | Patented | July 13, 1971 |
| [73] | Assignee | Braun Aktiengesellschaft<br>Frankfurt am Main, Germany |
| [32] | Priority | Dec. 8, 1967 |
| [33] | | Germany |
| [31] | | P 15 91 859.9 |

[54] VOLTAGE MEASURING AND INDICATING ARRANGEMENT
6 Claims, 2 Drawing Figs.

[52] U.S. Cl..................................................... 58/152,
58/23, 320/48
[51] Int. Cl....................................................... G04b 47/06
[50] Field of Search............................................58/23, 23 B,
23 A, 33, 152 H, 38; 320/48; 340/253 C; 324/157

[56] References Cited
UNITED STATES PATENTS

| 2,972,107 | 2/1961 | Criswell............... | 58/395 |
| 3,243,795 | 3/1966 | O'Brien................ | 58/23 |

Primary Examiner—Richard B. Wilkinson
Assistant Examiner—Edith C. Simmons
Attorney—Michael S. Striker ABSTRACT: An arrangement for measuring the voltage of a battery to determine the state of charge of the battery when used to operate electrical clocks. A momentary contact switch actuated by the clock mechanism at regular time intervals, connects the battery to a voltage-measuring instrument. An indicating device associated with the instrument is held in place by a holding device, after the measurement has been taken. The indicating device becomes released and permitted to return to its initial position prior to the instant when a subsequent measurement is to be taken. The clock mechanism in the form of the hour wheel actuates the momentary constant switch.

PATENTED JUL 13 1971
3,591,957
FIG.1
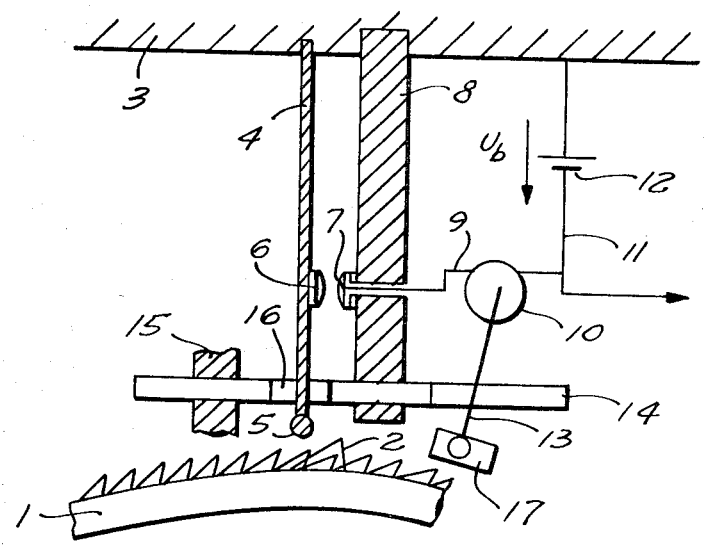
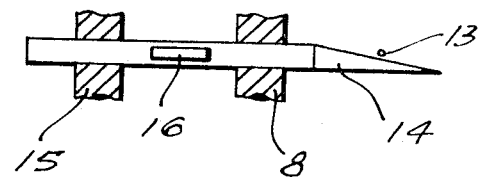
FIG.2
INVENTOR
CLAUS CHRISTIAN COBARG
BY
Michael S. Stuker
ATTORNEY

VOLTAGE MEASURING AND INDICATING ARRANGEMENT

BACKGROUND OF THE INVENTION

The present invention resides in an arrangement for automatically measuring and indicating voltages associated with electrically operated apparatus, particularly electrically operated clocks or watches.

Conventional arrangements of the preceding species, as known in the art, provide for controlling the charging state of batteries, by applying a measuring instrument to the battery. This measuring instrument measures the battery voltage and is connected to the battery through a pushbutton.

In electrically operated clocks or watches, it is desirable to determine the charged state of the battery, so that the battery may be replaced prior to the time that the clock becomes stopped as a result of the discharged state of the battery. Thus, it is possible to provide a voltage-measuring device or instrument which may be connected to the battery through manual actuation of a pushbutton. This type of control arrangement, however, has the disadvantage that actuation of the pushbutton will often be forgotten, and may at times, be entirely omitted. In conjunction with wall clocks, this method of measurement is, furthermore, of little use, since access to wall clocks is generally difficult or extremely inconvenient. To build in such a measuring arrangement, therefore, would not lead to the desired results, since the user of the clock would not apply the controlling arrangement in a regular manner.

Accordingly, it is an object of the present invention to obviate these disadvantages, and to provide a measuring and indicating arrangement through which automatic control is exercised, and the results are made visible. This object of the present invention is achieved by providing a switch actuated through the operation of the apparatus operated by the battery. The switch becomes actuated momentarily at predetermined time intervals, and connects a voltage-measuring instrument or device to the voltage source. At the end of the measuring operation, the measured results as provided by an indicator associated with the measuring instrument, are retained by holding in place the indicator.

When applied to clocks or watches, the switch is advantageously designed in the form of a wiping contact switch which is actuated by the hour wheel or gear of the clock.

In a further embodiment of the present invention, this switch is comprised of two separate switches connected in series. One of these two switches is actuated by the hour wheel, whereas the other one of the two switches is actuated by the seconds wheel. When the two switches become simultaneously closed at a predetermined instant of time, a coincidence circuit is established through the two switches, so as to form a closed circuit between the voltage source to be measured and the measuring instrument.

For the purpose of locking in place the measuring instrument at the end of the measurement, the indicator of the measuring instrument is designed in the form of a lag indicator which becomes returned to its original or initial position through automatic actuation of a pushbutton when the battery is replaced.

In a further advantageous embodiment of the present invention, the switch is coupled to a slide. The indicator is freely movable through the slide before and during the measurement being taken by the measuring instrument. At the conclusion of the measuring operation, the indicator becomes locked in place through the position of the slide.

A further embodiment of the present invention resides in the configuration in which the indicator is released, through the action of the hour wheel, prior to each measuring process or operation.

SUMMARY OF THE INVENTION

An arrangement for measuring the charged state of a battery by momentarily measuring its voltage. The arrangement is particularly adapted to determining the state of batteries used in conjunction with the operation of electrical clocks or watches. The hour wheel of the clock mechanism actuates a momentary contact switch which momentarily connects the battery to a voltage-measuring instrument or device. The measuring device includes an indicator which becomes mechanically deflected as a function of the magnitude of the measurement taken. After the indicator has been deflected through closure of the circuit by the momentary contact switch, the indicator is held in the place corresponding to the measurement taken, by a mechanical holding device. The indicator becomes released again from the grasp of the holding device, immediately prior to the subsequent measurement to be taken. The momentary contact switch is in the form of a leaf spring actuated by the clock mechanism.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a functional and operational schematic diagram of one embodiment of the present invention; and FIG. 2 is a partial sectional top view of a portion of the arrangement of FIG. 1, and shows the details of the holding device used to hold the indicated measurement, in accordance with the present invention.

DESCRIPTION OF THE PREFERRED EMBODIMENTS

Referring to the drawing, FIG. 1 shows an hour wheel in the form of a toothed wheel or gear. An auxiliary tooth 2 is mounted on the side of the gear 1, and projects beyond the other teeth of the gear distributed about the circumference or rim of the latter. In its path of motion, the auxiliary tooth 2 strikes the weight 5 suspended from a leaf spring 4. This leaf spring is held at one end within the housing 3 which supports the leaf spring in a cantilever manner. The weight 5 is suspended at the other end of the leaf spring 5, and is within the path of motion of the auxiliary tooth 2, as the gear 1 rotates.

Secured to the leaf spring 4, furthermore, is an electrical contact 6 facing an oppositely located contact 7. The latter is a fixed and stationary contact held by a fixed and rigid arm 8 mounted securely to the housing 3. When the leaf spring 4 becomes deflected as a result of the motion of the auxiliary tooth 2 against the weight 5, the contact 6 strikes the contact 7. After the contact 6 has thus struck the fixed contact 7, the movable contact 6 will proceed to swing back and forth due to the oscillating character of the leaf spring 4 in combination with the weight 5. Thus, the leaf spring 4 and weight 5 form a pendulum type of structure which when actuated will undergo several swings or oscillations. After the leaf spring 4 has gone through several such swings or oscillations, the motion decays, and the leaf spring remains in its normal or initial position illustrated in the drawing of FIG. 1.

The fixed contact 7 is isolatingly secured to the fixed and rigid arm 8. The arrangement is such that the fixed contact 7 is electrically isolated from the arm 8. A conductor 9 connects the fixed contact 7 with a measuring instrument 10. The second terminal of the measuring instrument 10 is connected to one terminal of a test battery 12, through the second conductor 11. The other terminal or pole of the battery 12 is electrically connected to the housing 3 of the watch or clock.

The measuring instrument 10 has an indicator 13 extending past a slide 14 which is actuated or positioned by the leaf spring 4. The slide 14 is movably held and guided by the stationary and rigid arm 8, as well as the supporting slide bearing 15. After the indicator 13 has been positioned in accordance with a specific measurement carried out by the measuring instrument 10, the indicator 13 becomes locked or held in place through the positioning of the slide 14 which becomes actuated by the leaf spring 4.

FIG. 2 shows a sectional view of the slide 14 perpendicular to the plane of the drawing. At its front portion, the slide 14 is wedge shaped for the purpose of locking or holding in place the indicator 13 of the measuring instrument 10. The slide 14 includes a slot 16 located between the supports 8 and 15 which movably guide the slide 14. The leaf spring 4 projects through the slot 16 which passes through the slide 14 at right angle to the plane thereof.

When the leaf spring 4 becomes deflected so that it is in a tensioned state or position, the slide 14 becomes retracted so that the indicator 13 of the measuring instrument 10 is allowed to return to its initial or null position. Thus, when the wedge-shaped portion 14 is in the forward position, it wedges or bears against the indicator arm 13, and as a result of the tight pressure against this indicator arm 13, the latter is prevented from swinging back to its initial or original position after it has been deflected. When the wedge-shaped portion 14 is moved against the indicator arm 13, the contact pressure between these two elements gives rise to frictional forces which hold the indicator arm 13 firmly in place, and in the position in which it was deflected through the measurement taken by the measuring instrument 10. In a further advantageous embodiment, the indicator 13 of the measuring instrument is released by providing an auxiliary nose portion at the location at which the leaf spring passes through the slide. This hose portion is made such so that the auxiliary tooth of the hour gear or wheel, which actuates the leaf spring, also grips or contacts this auxiliary nose portion. When the leaf pring becomes thereby tensioned, the indicator of the measuring instrument becomes released. If, now, the auxiliary tooth 2 moves past the leaf spring 4 so that the latter becomes released from contact with the auxiliary tooth 2, the movable contact 6 strikes the fixed contact 7, and as a result the battery 12 is applied across the measuring instrument 10. Thus, when the movable contact 6 is in electrical contact with the fixed counterpart 7, the circuit of the battery 12 to the measuring instrument 10 is completed through the housing 3 which is made of conductive material. With the battery 12 applied to the measuring instrument 10, in this manner, the latter may perform the desired measurement and provide an indication through the deflection of the arm for indicator 13. After the measuring instrument has carried out the designated measurement and the indicator 13 has been correspondingly deflected, the swinging or pendulum weight 5 of the leaf spring 4 forces the slide 14 into its locking or holding position. The indicator 13 thereby becomes securely held in its measured position. If, in the event, the indicator deflection is too light or weak, the indicator becomes visible through the window 17, and thereby shows that the battery must be replaced.

It will be understood that each of the elements described above, or two or more together, may also find a useful application in other types of constructions differing from the types described above.

While the invention has been illustrated and described as embodied in automatic measuring and indicating arrangements, it is not intended to be limited to the details shown, since various modifications and structural changes may be made without departing in any way from the spirit of the present invention.

What I claim as new and desired to be protected by Letters Patent is set forth in the appended claims:

1. A measuring and indicating arrangement comprising, in combination, a source of electrical energy of which a parameter is to be measured; measuring means connectable to said source of electrical energy for measuring said parameter; momentary contact means for connecting momentarily said source of electrical energy to said measuring means at predetermined time intervals; clock means operated by said source of electrical energy and actuating said momentary contact means; indicating means associated with said measuring means for indicating the measurement taken by said measuring means; and holding means for holding said indicating means at said measurement taken after disconnecting said source of electrical energy from said measuring means by said momentary contact means.

2. The measuring and indicating arrangement as defined in claim 1 wherein said parameter is the voltage of said source of electrical energy.

3. The measuring and indicating arrangement as defined in claim 1 wherein said momentary contact means comprises a wiping contact switch actuated by the hour wheel of said clock means.

4. The measuring and indicating arrangement as defined in claim 1 wherein said holding means comprises a slide member mechanically coupled to said momentary contact means, said slide member holding said indicating means at said measurement taken and thereafter releasing said indicating means prior to the taking of a subsequent measurement.

5. The measuring and indicating arrangement as defined in claim 4 said slide member being released by the hour wheel of said clock means and thereby releasing said indicating means to return to its initial position.

6. The measuring and indicating arrangement as defined in claim 1, including means actuating said holding means for releasing said indicating means after a predetermined interval, said indicating means returning to its initial position after release from said holding means.